United States Patent
Hagiwara

(10) Patent No.: US 10,616,479 B2
(45) Date of Patent: Apr. 7, 2020

(54) IMAGE RECORDING APPARATUS, IMAGE RECORDING METHOD, AND COMPUTER-READABLE STORAGE MEDIUM

(71) Applicant: Casio Computer Co., Ltd., Tokyo (JP)

(72) Inventor: Kazuaki Hagiwara, Koshigaya (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 16/033,826

(22) Filed: Jul. 12, 2018

(65) Prior Publication Data

US 2019/0020813 A1    Jan. 17, 2019

(30) Foreign Application Priority Data

Jul. 14, 2017    (JP) .................... 2017-137615

(51) Int. Cl.
| | |
|---|---|
| *H04N 5/232* | (2006.01) |
| *H04N 5/225* | (2006.01) |
| *G06T 7/20* | (2017.01) |
| *H04N 5/14* | (2006.01) |
| *H04N 5/77* | (2006.01) |
| *H04N 9/82* | (2006.01) |

(52) U.S. Cl.
CPC .......... *H04N 5/23229* (2013.01); *G06T 7/20* (2013.01); *H04N 5/144* (2013.01); *H04N 5/2254* (2013.01); *H04N 5/23296* (2013.01); *H04N 5/772* (2013.01); *H04N 9/8205* (2013.01)

(58) Field of Classification Search
CPC .. H04N 5/23229; H04N 5/772; H04N 9/8205; H04N 5/23296; H04N 5/144; H04N 5/2254; G06T 7/20
See application file for complete search history.

(56) References Cited

U.S. PATENT DOCUMENTS

| | | | | |
|---|---|---|---|---|
| 8,558,759 | B1 * | 10/2013 | Prada Gomez | G06F 3/017 345/156 |
| 9,076,033 | B1 * | 7/2015 | Barron | G06K 9/00355 |
| 2003/0179301 | A1 * | 9/2003 | Feldis | G11B 27/105 348/231.3 |
| 2013/0007043 | A1 * | 1/2013 | Phillips | G06F 16/48 707/769 |
| 2013/0155255 | A1 * | 6/2013 | Yu | H04N 5/23203 348/164 |

(Continued)

FOREIGN PATENT DOCUMENTS

| | | |
|---|---|---|
| JP | 2000056827 A | 2/2000 |
| JP | 2002142189 A | 5/2002 |

(Continued)

OTHER PUBLICATIONS

JPO; Application No. 2017-137615; Notice of Reasons for Refusal dated Jul. 24, 2019.

*Primary Examiner* — Timothy J Henn
(74) *Attorney, Agent, or Firm* — Fitch, Even, Tabin & Flannery LLP

(57) ABSTRACT

A image recording apparatus includes a processor. The processor recognizes a predetermined action by a user when an image is recorded by capturing. The processor adds additional information corresponding to the recognized predetermined action to the captured image obtained by the capturing. The processor controls recording of the captured image with the additional information added.

25 Claims, 2 Drawing Sheets

| ACTION CLASSIFICATION | ACTION | EVALUATION INFORMATION |
|---|---|---|
| GESTURE | MAKE A CIRCLE WITH THUMB AND INDEX FINGER | EVALUATION 0 |
| | RAISE ONLY INDEX FINGER | EVALUATION 1 |
| | RAISE BOTH INDEX FINGER AND MIDDLE FINGER | EVALUATION 2 |
| | ⋮ | ⋮ |
| SOUND1 | BLOW WHISTLE LONG ONCE | EVALUATION 0 |
| | BLOW WHISTLE SHORT ONCE | EVALUATION 1 |
| | BLOW WHISTLE SHORT TWICE | EVALUATION 2 |
| | ⋮ | ⋮ |
| SOUND2 | SAY "FAILED" | EVALUATION 0 |
| | SAY "ONE" | EVALUATION 1 |
| | SAY "TWO" | EVALUATION 2 |
| | ⋮ | ⋮ |

131

(56) References Cited

U.S. PATENT DOCUMENTS

| | | | | |
|---|---|---|---|---|
| 2014/0254870 A1* | 9/2014 | Tsukamoto | ......... | G06K 9/00355 |
| | | | | 382/103 |
| 2015/0070272 A1* | 3/2015 | Kim | ......... | G06F 3/005 |
| | | | | 345/156 |
| 2015/0100578 A1* | 4/2015 | Rosen | ......... | G06F 17/2247 |
| | | | | 707/737 |
| 2016/0091964 A1* | 3/2016 | Iyer | ......... | G02B 27/017 |
| | | | | 345/633 |
| 2017/0004140 A1* | 1/2017 | Wang | ......... | G06F 16/7867 |
| 2017/0060251 A1* | 3/2017 | Choi | ......... | G06F 3/017 |

FOREIGN PATENT DOCUMENTS

| JP | 2003-298916 A | 10/2003 |
|---|---|---|
| JP | 2007-82088 A | 3/2007 |
| JP | 2009-218976 A | 9/2009 |
| JP | 2010239363 A | 10/2010 |
| JP | 2013182457 A | 9/2013 |
| JP | 2015-177432 A | 10/2015 |

\* cited by examiner

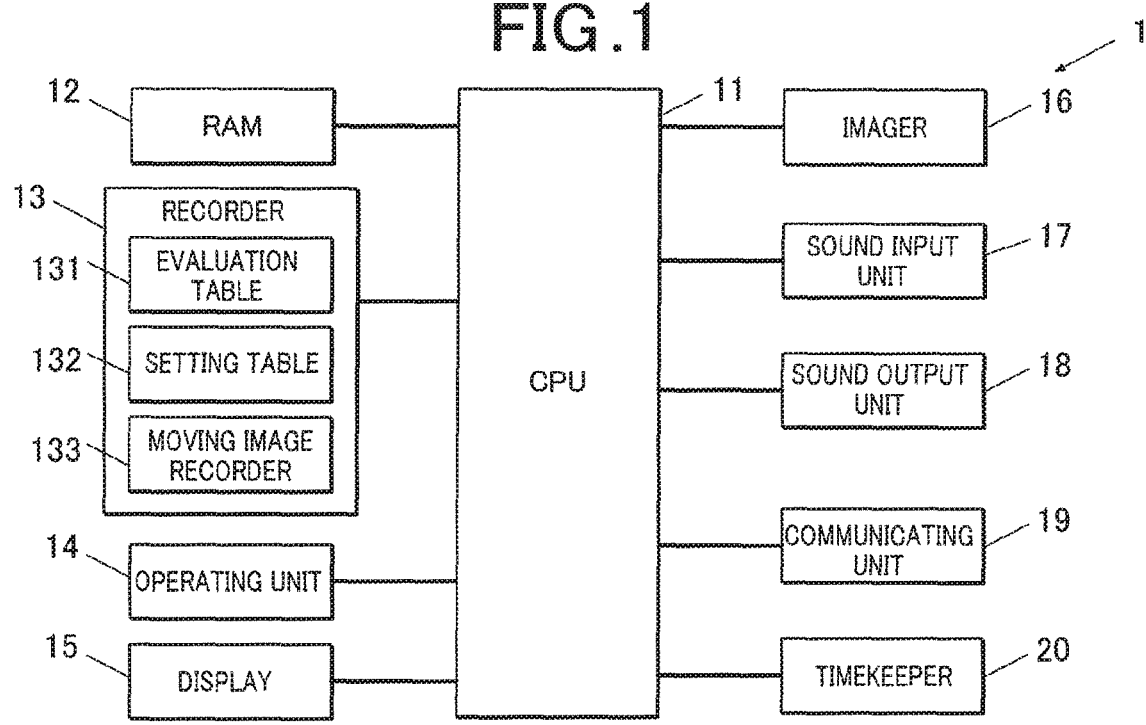

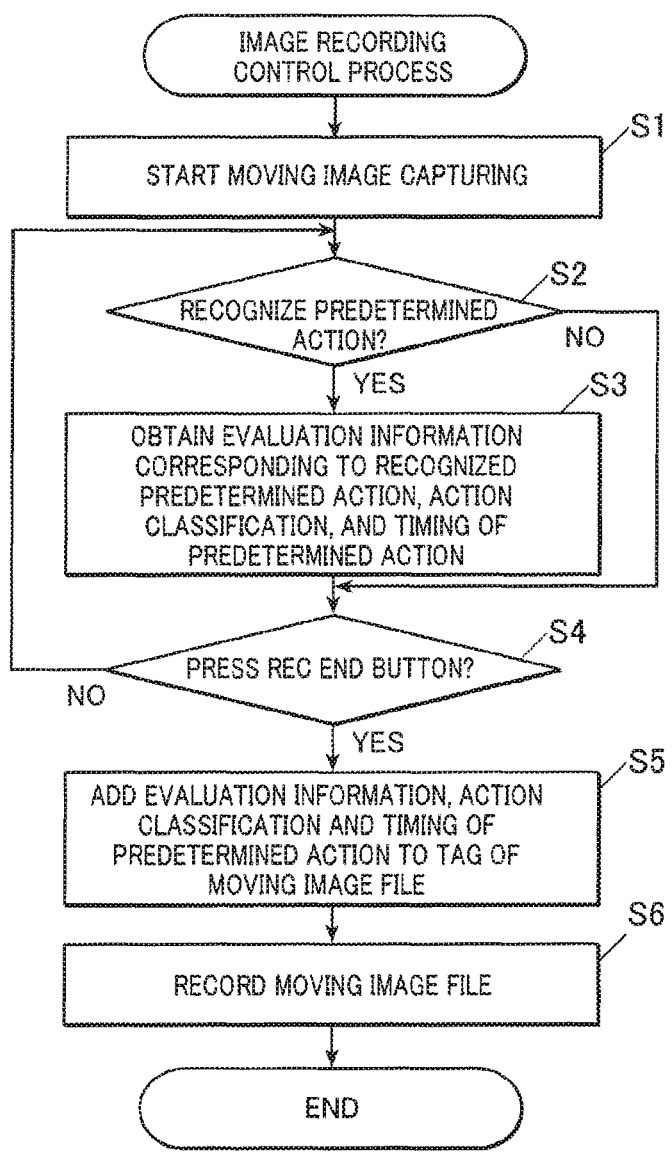

IMAGE RECORDING APPARATUS, IMAGE RECORDING METHOD, AND COMPUTER-READABLE STORAGE MEDIUM

CROSS-REFERENCE TO RELATED APPLICATIONS

This application is based upon and claims the benefit of priority from the prior Japanese Patent Application No. 2017-137615, filed on Jul. 14, 2017, the entire contents of which are incorporated herein by reference.

BACKGROUND OF THE INVENTION

1. Field of the Invention

The present invention relates to an image recording apparatus, an image recording method, and a computer-readable storage medium.

2. Description of the Related Art

Japanese Patent Application Laid-Open Publication No. 2002-142189 describes dividing recorded moving image data into a plurality of scenes, and evaluating each scene of the moving image data according to a plurality of conditions.

SUMMARY OF THE INVENTION

According to an aspect of the present invention there is a image recording apparatus including: a processor, wherein, the processor recognizes a predetermined action by a user when an image is recorded by capturing, the processor adds additional information corresponding to the recognized predetermined action to the captured image obtained by the capturing, and the processor controls recording of the captured image with the additional information added.

According to another aspect of the present invention, there is an image recording method including: recognizing a predetermined action by a user when an image is recorded by capturing; adding additional information corresponding to the recognized predetermined action to the captured image obtained by the capturing; and controlling recording of the captured image with the additional information added.

According to another aspect of the present invention, there is a non-transitory computer-readable storage medium having a program stored thereon for controlling a computer to perform the following process: recognizing a predetermined action by a user when an image is recorded by capturing; adding additional information corresponding to the recognized predetermined action to the captured image obtained by the capturing; and controlling recording of the captured image with the additional information added.

BRIEF DESCRIPTION OF THE DRAWINGS

The invention will become more fully understood from the detailed description given hereinbelow and the appended drawings which are given by way of illustration only, and thus are not intended to define the limits of the present invention.

FIG. 1 is a block diagram showing a functional configuration of an image recording apparatus according to the present embodiment.

FIG. 2 is a diagram showing a data storage example of an evaluation table.

FIG. 3 is a flowchart showing an image recording control process executed by the CPU shown in FIG. 1.

DETAILED DESCRIPTION OF THE PREFERRED EMBODIMENTS

An embodiment of the present invention is described in detail with reference to the drawings. However, the present invention is not limited to the illustrated examples.

[Configuration of Image Recording Apparatus 1]

The image recording apparatus 1 is an apparatus which performs image capturing according to an instruction from a user (person capturing a subject) and records the obtained captured image. According to the present embodiment, the image recording apparatus 1 performs moving image capturing and the obtained moving image is recorded.

FIG. 1 is a block diagram showing a functional configuration of the image recording apparatus 1. As shown in FIG. 1, the image recording apparatus 1 includes a CPU 11, a RAM 12, a recorder 13, an operating unit 14, a display 15, an imager 16, a sound input unit 17, a sound output unit 18, a communicating unit 19, a timekeeper 20, and the like. The CPU 11 is connected to each section through a bus.

The CPU 11 is a processor which executes various programs stored in the recorder 13 to perform predetermined calculating and to control each section. For example, when the moving image capturing is instructed on the operating unit 14, the CPU 11 performs a later-described image recording control process.

The RAM 12 provides a work memory space in the CPU 11 and temporarily stores data.

The recorder 13 includes a non-volatile semiconductor memory and a hard disk. The recorder 13 stores a system program and various processing programs executed on the CPU 11 and the data necessary to execute these programs.

For example, the recorder 13 stores the evaluation table 131. FIG. 2 is an example showing a data storage example of the evaluation table 131. A shown in FIG. 2, the evaluation table 131 stores a predetermined action performed by the user (person capturing subject) associated with evaluation information corresponding to the action. The evaluation information shows a score evaluating how good the action captured in the moving image is, but the evaluation information may show evaluation of whether the action succeeded or failed. The score may show evaluation of priority or importance of the captured moving image.

The recorder 13 stores a setting table 132. The setting table 132 stores setting information of operation on a moving image file to which evaluation information is added. Such setting information can be set by the user through the operating unit 14 or the communicating unit 19.

The recorder 13 includes a moving image recorder 133 which records a moving image file generated in the later-described image recording control process.

The operating unit 14 includes various functional buttons such as a REC button or REC end button. The operating unit 14 receives input when the user presses the buttons, and the information regarding the operation is output to the CPU 11. The operating unit 14 also includes a touch panel positioning transparent electrodes in a grid shape so as to cover the surface of the display 15. The operating unit 14 detects various operations performed on the touch panel using fingers or a touch pen, and the operation information is output to the CPU 11.

The display 15 includes a LCD (Liquid Crystal Display) and performs various display on the screen according to the display control signal from the CPU 11.

The imager 16 includes, an optical lens unit, an imagining element including image sensors such as a CCD (Charge Coupled Device), a CMOS (Complementary Metal-oxide Semiconductor), etc., an A/D converting circuit, and the like. The imager 16 converts the optical image passing the lens to the two-dimensional image signal with the imaging elements and obtains the image data (frame image) of the moving image.

The sound input unit 17 includes a microphone. The sound input unit 17 converts the input sound to the electric signal and outputs the signal to the CPU 11.

The sound output unit 18 includes a speaker and outputs the sound based on the sound data instructed from the CPU 11.

The communicating unit 19 is an interface to perform data communication with an external device by wired or wireless communication.

The timekeeper 20 includes an RTC (Real Time Clock), etc. and keeps the present time which is output to the CPU 11.

[Operation of Image Recording Apparatus 1]

Next, the operation of the image recording apparatus 1 is described.

For example, conventionally, a user may repeatedly perform sports activities such as jumping with a BMX using a jump ramp, or trick action with a skateboard and the user may repeatedly capture the movements with a moving image. When the captured moving image is recorded, a plurality of similar moving image files may be recorded. In such case, it is difficult to discriminate the result (success, failure, etc.) of the action recorded in the moving file from just a thumbnail image, for example. In order to discriminate the contents in the moving image file, the user needs to recheck the moving image file and attach information. Such troublesome work is necessary.

According to the above-described embodiments, when the moving image recording is instructed, the image recording apparatus 1 performs the image recording control process, and when the user performs the predetermined operation while the moving image is being captured (from when the REC button is pressed to when the REC end button is pressed) the predetermined operation is recognized and the evaluation information corresponding to the operation is added to the moving image file. Such moving image file is recorded in the recorder 13. Therefore, for example, when the user performs the action while the moving image is being captured and performs a predetermined action corresponding to the evaluation of the action, the evaluation information corresponding to the action can be easily added to the moving image file.

FIG. 3 is a flowchart showing an image recording control process. In the image recording control process, the REC button of the operating unit 14 is pressed, and when the moving image recording is instructed, the recording is performed by the CPU 11 in coordination with the program stored in the storage 13. Below, the image recording control process is described with reference to FIG. 3.

The CPU 11 instructs the start of moving image capturing to the imager 16 and the sound input unit 17 when the moving image capturing starts, and obtains the capturing start time from the timekeeper 20 (step S1).

Next, the CPU 11 determines whether the predetermined action registered in the evaluation table 131 is recognized (step S2).

In step S2, the CPU 11 analyzes the frame images sequentially obtained by the imager 16 and performs the process to recognize the predetermined action registered in the evaluation table 131 (gestures performed remote from the apparatus). For example, a template image showing a predetermined action (for example, make a circle with the thumb and the index finger, raise only the index finger, raise both the index finger and the middle finger) is stored in advance in the recorder 13 and when the image similar to the template image (image with a similarity (for example, cross correlation coefficient) with the template image being a threshold or higher) is recognized from the frame image, it is determined that the predetermined action registered in the evaluation table 131 is recognized.

The CPU 11 determines whether the sound is input on the sound input unit 17, and when the sound is input, the sound is analyzed. It is determined whether the sound is a sound (predetermined sound remote from the apparatus) corresponding to the predetermined action registered in the evaluation table 131. When the input sound is a sound corresponding to the predetermined action, the CPU 11 determines the predetermined action registered in the evaluation table 131 is recognized.

In step S2, when it is determined that the predetermined action is recognized (step S2; YES), the CPU 11 obtains the evaluation information corresponded to the recognized action in the evaluation table 131, and the information showing the action classification (sound, gesture, etc.) and the timing that the action is performed (for example, amount of time that passed from the start of capturing for the term when the predetermined action is recognized or the frame number of the frame image for the term when the predetermined action is recognized) and stores the information in the RAM 12 (step S3). With this, the process advances to step S4.

In step S2, when it is determined that the predetermined action is not recognized (step S2; NO), the CPU 11 advances the process to step S4.

In step S4, the CPU 11 determines whether the REC end button is pressed (step S4).

When it is determined that the REC end button is not pressed (step S4; NO), the CPU 11 returns the process to step S2.

When it is determined that the REC end button is pressed (step S4; YES), the CPU 11 generates the moving image file in a predetermined format from the series of frame images and sound data obtained by the moving image capturing, and adds evaluation information, action classification and the information showing timing that the predetermined action is performed stored in the RAM 12 to the tag of the moving image file (step S5). Then, the CPU 11 records the moving image file in which the evaluation information, etc. is added in the moving image recorder 133 (step S6), and ends the image recording control process.

For example, when the user presses the REC button of the image recording apparatus 1 to start moving image capturing, the user performs the trick action with the skateboard, the user performs the action corresponding to the evaluation of the performed action within a range that the imager 16 of the image recording apparatus 1 can image and the user presses the REC end button, the moving image file is stored with the evaluation information for the performed action added. Therefore, the operation of adding the evaluation information to the moving image file in a separate occasion is not necessary. Specifically, when the user repeatedly performs the trick action, the user repeats the moving image capturing, and the captured moving image is recorded, a plurality of similar moving image files are recorded. Since the evaluation information is added to each moving image file, the user does not have to perform the troublesome process of rechecking all of the moving image files and adding the evaluation information. Therefore, the convenience increases.

The record of the moving image file may be controlled based on the evaluation information added to the moving image file. For example, when the evaluation information added to the moving image file is "evaluation 0", the moving image file is not recorded even if the REC end button is pressed. With this, the user can omit from the target of recording the file with the low evaluation by simply adding the evaluation information. With this, the convenience increases.

The CPU 11 refers to the setting table 132 and controls the operation on the moving image file based on the evaluation information added to the moving image file.

For example, when it is set in the setting table 132 to delete the moving image file with "evaluation 0", the CPU 11 deletes the moving image file with the evaluation information of "evaluation 0" added from the moving image recorder 133. Alternatively, when it is set in the setting table 132 not to display the moving image file with "evaluation 0" on the file list, the CPU 11 does not display the moving image file with the evaluation information of "evaluation 0" added in the list of files when the file list is displayed on the display 15.

For example, when it is set in the setting table 132 to transmit the moving image file with the "evaluation 2" to a predetermined external device such as a smartphone, the CPU 11 transmits the moving image file with the evaluation information of "evaluation 2" added to the set external device through the communicating unit 19.

As described above, the CPU 11 controls the operation on the moving image file based on the evaluation information added to the moving image file. Therefore, suitable operation according to the added evaluation information can be performed on the moving image file.

For example, the CPU 11 can change the display according to the evaluation information when the moving image file is displayed as a list. With this, the user is able to easily find the moving image file with the desired evaluation.

The CPU 11 plays the moving image file (the image data of the moving image file is displayed on the display 15 and the sound is output by the sound output unit 18), the CPU 11 controls the display 15 and the sound output unit 18 so that the moving file is not played when the predetermined action is recognized. The action performed to add evaluation information is a portion of the moving image which does not need to be seen and such portion is not played.

For example, when the predetermined action recognized in the moving image capturing is a predetermined sound, the CPU 11 controls the sound output unit 18 so that the predetermined sound is erased based on the information showing the timing that the predetermined action added to the moving image file is performed.

For example, when the predetermined action recognized during the moving image capturing is a predetermined gesture, the CPU 11 controls the display 15 to play the moving image file skipping (without) the frame images in which the predetermined gesture is recognized in the moving image based on the information showing the timing that the predetermined action added to the moving image file is performed.

Moreover, when the CPU 11 generates the moving image file, the portion of the predetermined sound corresponding to the evaluation information is deleted from the sound data.

As described above, the CPU 11 of the image recording apparatus 1 recognizes a predetermined action by the user during moving image capturing (for example, a predetermined sound or predetermined gesture), adds the evaluation information corresponding to the recognized predetermined action to the moving image file obtained by the moving image capturing, and records the moving image file with the evaluation information added in the moving image recorder 133. For example, the predetermined action and the evaluation information corresponding to the action is stored corresponded to each other in the evaluation table 131. The CPU 11 adds the evaluation information corresponding to the recognized action to the moving image file when the action stored in the evaluation table 131 is recognized.

Therefore, it is possible to easily add the evaluation information desired by the user to the moving image file without troublesome work such as rechecking the moving image file.

For example, the CPU 11 controls the operation on the moving image file based on the evaluation information added to the moving image file. Therefore, the operation on the moving image file can be changed according to the evaluation by the user.

For example, when the CPU 11 recognizes a predetermined sound is input through the sound input unit 17, the CPU 11 deletes the sound. Therefore, the sound input for evaluation is not played.

For example, when the CPU 11 plays the moving image file with the evaluation information corresponding to the predetermined action recognized during the moving image capturing, the CPU 11 controls the operation so that the recognized predetermined action is not played.

For example, when the recognized predetermined action is a predetermined sound, the CPU 11 controls the sound output unit 18 so that the predetermined sound is deleted when the moving image file is played. Therefore, the sound input for evaluation is not played.

Moreover, for example, when the recognized predetermined action is a predetermined gesture, the CPU 11 controls the display 15 so that the frame images in the moving image in which the predetermined gesture is recognized is not played when the moving image file is played. Therefore, the gesture to input the evaluation is not played.

The above description of the present embodiment is one example of a suitable image recording apparatus according to the present invention, and the present invention is not limited to the above.

For example, according to the above-described embodiments, predetermined actions corresponding to evaluation information are input as gestures or sound, but the predetermined action corresponding to the evaluation information can be input using the sensor terminal (for example, acceleration sensor and gyro sensor). For example, the action to move the sensor terminal in the vertical direction or the horizontal direction a predetermined amount of times can be the predetermined action corresponding to the evaluation information. Alternatively, input on the input terminal such as the operating unit 14 or the keyboard can be the predetermined action corresponding to the evaluation information.

According to the above-described embodiment, the evaluation information according to the predetermined action is described with the moving image file added, but the additional information added to the moving image file is not limited to the evaluation information. For example, the predetermined action and the identification information of the subject (name, etc.) can be stored corresponded to each other in the recorder 13, and the subject identification information according to the predetermined action performed by the user during the moving image capturing can be added to the moving image file. With this, when the moving image capturing is performed by a plurality of people using the image recording apparatus 1, it is possible to easily add to the moving image file the information to identify each subject. The predetermined action to add the identification information of the subject may be performed before or after the action which is the target of capturing.

The image recording apparatus 1 can be a whole sky camera including a wide angle lens or a fish eye lens. Since the whole sky camera has a wide angle of view, capturing can be performed in a wide range, and this is suitable for capturing an action in sports from the start to the end. After the action ends, there is no need to return the angle of view as in a normal camera to perform the gesture corresponding to the evaluation. Therefore, the operability is enhanced.

When a plurality of image recording apparatuses 1 are connected, and the moving image capturing is performed by a plurality of image recording apparatuses 1 (for example, when the action is captured from a plurality of directions), when a predetermined action according to the evaluation information is recognized by one of the plurality of image recording apparatuses 1, the same additional information can be added to not only to the moving image file obtained by the certain image recording apparatus 1 but also to the other moving image files obtained from the other image recording apparatuses. With this, when the moving image capturing is performed using the plurality of image recording apparatuses, the input of the evaluation information does not need to be performed on all of the image recording apparatuses, and the predetermined action needs to be performed for only one image recording apparatus. With this, the operability is enhanced.

According to the above described embodiment, the image recording apparatus 1 includes an imager (capturing apparatus) which captures an image. The capturing apparatus can be a component separate from the image recording apparatus 1. For example, the capturing apparatus which performs the moving image capturing and the controller which controls the capturing apparatus can be connected by a cable. The frame images and sound data obtained by the capturing apparatus in the moving image capturing are successively transmitted to the controller. In the controller, the predetermined action by the user during the moving image capturing is recognized based on the received frame image and the sound data. The evaluation information corresponding to the recognized predetermined action can be added to the moving image file and recorded in the recorder of the controller.

According to the present embodiment and the modification, the moving image is described as the image obtained in the image capturing. The captured image is not limited to the moving image and can be a still image. That is, the additional information corresponding to the predetermined action performed by the user during the still image capturing can be added to the still image obtained in the capturing. Here, "during the still image capturing" is not limited to the timing that the recorded still image is obtained by the imager 16 and also includes the term while the preview image to determine the recorded still image is obtained by the imager 16.

For example, when the image recording apparatus 1 is set to the still image capturing mode and the still image capturing starts, the imager 16 successively obtains the preview image. The CPU 11 temporarily stores the preview image obtained by the imager 16 in the RAM 12. When the shutter switch is pressed in the operating unit 14, the CPU 11 analyzes the preview image stored in the RAM 12 and the sound input by the sound input unit 17 while the preview image is obtained. When the predetermined action by the user (gesture or sound) is recognized, the additional information corresponding to the recognized action is added to the obtained still image by the imager 16 in response to pressing the shutter switch, and the above is recorded in the recorder 13. The preview image temporarily stored in the RAM 12 is deleted.

The method of recognizing the predetermined action during the capturing of the still image is the same as described in the above embodiment. The CPU 11 similarly controls the operation on the still image based on the additional information added to the recorded still image.

According to the present embodiment, the predetermined action by the user is a gesture or a sound, but the predetermined action by the user is not limited to a gesture or a sound, and may be user operation of a remote controller corresponding to the image recording apparatus.

For example, evaluation information corresponding to the user operation of the remote controller during moving image capturing is added to the moving image file.

Consequently, there is no need to do troublesome work such as recheck the moving image file. Therefore, the user is able to easily add the desired evaluation information to the moving image file.

According to the above-described embodiments, when the REC end button is pressed, the moving image is recorded with the evaluation information for the performed action added. The recording of the moving image file with the evaluation information for the action added is not limited to pressing the REC end button, and the capturing of the image may end when the evaluation information satisfies a predetermined condition. The capturing of the image may be repeated until the evaluation information satisfies a predetermined condition.

For example, when the capturing end condition is to end capturing of the image when evaluation 2 continues five times, the capturing of the image ends without pressing the REC end button when the evaluation information of the action in one capturing being evaluation 2 continues five times. When the evaluation information of the action in one capturing being evaluation 2 continues three times, the capturing of the image does not end, and the next capturing of the image is performed again.

According to the above description, a hard disk or nonvolatile semiconductor memory is used as the computer-readable medium storing the program to perform various processes according to the present invention, but the present invention is not limited to the above. As other computer-readable mediums, a portable recording medium such as a CD-ROM can be used. As the medium to provide data of the program through the communication line, a carrier wave can be applied.

The detailed configuration and the detailed operation of the devices composing the image recording apparatus can be suitably modified without leaving the scope of the present invention.

According to the embodiments of the present invention, the scope of the present invention is not limited to the embodiments described above. The scope of the present invention includes the present invention as claimed and its equivalents.

What is claimed is:
1. An image recording apparatus comprising:
a processor, wherein, the processor recognizes a predetermined action by a user when an image is recorded by capturing, the processor adds additional information corresponding to the recognized predetermined action to the captured image obtained by the capturing, and the processor controls recording of the captured image with the additional information added, wherein the captured image is a moving image and the predetermined action includes a predetermined sound, and wherein when the processor recognizes that the predetermined sound is produced, the processor deletes sound which is included in the moving image at a timing in which the predetermined sound is produced.

2. The image recording apparatus according to claim 1, further comprising a storage which stores the predetermined action associated with the additional information corresponding to the action, wherein the processor adds the additional information corresponding to the recognized action to the captured image when the processor recognizes the action stored in the storage.

3. The image recording apparatus according to claim 1, wherein the additional information is evaluation information of the captured image or identification information of a subject.

4. The image recording apparatus according to claim 1, wherein the processor controls the operation on the captured image based on the additional information added to the captured image.

5. The image recording apparatus according to claim 1, wherein the processor controls the capturing based on the additional information corresponding to the recognized predetermined action.

6. The image recording apparatus according to claim 5, wherein the processor ends the capturing when the additional information satisfies a predetermined condition.

7. The image recording apparatus according to claim 5, wherein the processor performs the capturing until the additional information satisfies a predetermined condition.

8. The image recording apparatus according to claim 1, further comprising a communicating unit which communicates with an external device, wherein the processor controls the communicating unit which transmits the captured image to the external device based on the additional information added to the captured image.

9. The image recording apparatus according to claim 1, wherein the processor controls so as not to record the captured image when the additional information added to the captured image is predetermined evaluation information.

10. An image recording apparatus comprising:
a processor, and
a player which plays a moving image,
wherein,
the processor recognizes a predetermined action by a user when the moving image is recorded by capturing,
the processor adds additional information corresponding to the recognized predetermined action to the captured moving image obtained by the capturing,
the processor controls recording of the captured moving image with the additional information added, and
the processor controls the player so that a timing in which the predetermined action is recognized is not played when the moving image is played on the player.

11. The image recording apparatus according to claim 10, wherein when the recognized predetermined action is the user producing a predetermined sound, the processor controls the player so that the sound is not output at the timing in which the predetermined sound is produced when the moving image is played on the player.

12. The image recording apparatus according to claim 10, wherein when the recognized predetermined action is a predetermined gesture, the processor controls the player so that the frame images in which the predetermined gesture is recognized in the moving image is removed from a target of playing when the moving image is played on the player.

13. The image recording apparatus according to claim 10, further comprising a storage which stores the predetermined action associated with the additional information corresponding to the action, wherein the processor adds the additional information corresponding to the recognized action to the captured image when the processor recognizes the action stored in the storage.

14. The image recording apparatus according to claim 10, wherein the additional information is evaluation information of the captured image or identification information of a subject.

15. The image recording apparatus according to claim 10, wherein the processor controls the operation on the captured image based on the additional information added to the captured image.

16. The image recording apparatus according to claim 10, wherein the predetermined action includes a predetermined sound or a predetermined gesture.

17. The image recording apparatus according to claim 10, wherein the processor controls the capturing based on the additional information corresponding to the recognized predetermined action.

18. The image recording apparatus according to claim 10, wherein the processor ends the capturing when the additional information satisfies a predetermined condition.

19. The image recording apparatus according to claim 10, wherein the processor performs the capturing until the additional information satisfies a predetermined condition.

20. The image recording apparatus according to claim 10, further comprising a communicating unit which communicates with an external device, wherein the processor controls the communicating unit which transmits the captured image to the external device based on the additional information added to the captured image.

21. The image recording apparatus according to claim 10, wherein the processor controls so as not to record the captured image when the additional information added to the captured image is predetermined evaluation information.

22. An image recording method comprising:
recognizing a predetermined action by a user when an image is recorded by capturing;
adding additional information corresponding to the recognized predetermined action to the captured image obtained by the capturing; and
controlling recording of the captured image with the additional information added,
wherein the captured image is a moving image and the predetermined action includes a predetermined sound, and
wherein when the predetermined sound that is produced is recognized, sound which is included in the moving image at a timing in which the predetermined sound is produced is deleted.

23. A non-transitory computer-readable storage medium having a program stored thereon for controlling a computer to perform the following process:

recognizing a predetermined action by a user when an image is recorded by capturing;

adding additional information corresponding to the recognized predetermined action to the captured image obtained by the capturing; and controlling recording of the captured image with the additional information added, wherein the captured image is a moving image and the predetermined action includes a predetermined sound, and wherein when the predetermined sound that is produced is recognized, sound which is included in the moving image at a timing in which the predetermined sound is produced is deleted.

24. An image recording method comprising:

recognizing a predetermined action by a user when a moving image is recorded by capturing;

adding additional information corresponding to the recognized predetermined action to the captured moving image obtained by the capturing;

controlling recording of the captured moving image with the additional information added; and controlling a player that plays the moving image so that a timing in which the predetermined action is recognized is not played when the moving image is played on the player.

25. A non-transitory computer-readable storage medium having a program stored thereon for controlling a computer to perform the following process:

recognizing a predetermined action by a user when a moving image is recorded by capturing;

adding additional information corresponding to the recognized predetermined action to the captured moving image obtained by the capturing;

controlling recording of the captured moving image with the additional information added; and controlling a player that plays the moving image so that a timing in which the predetermined action is recognized is not played when the moving image is played on the player.

* * * * *